US005642268A

United States Patent [19]

Pratt et al.

[11] Patent Number: 5,642,268

[45] Date of Patent: Jun. 24, 1997

[54] POWER SUPPLY FOR A MAGNETRON HAVING CONTROLLED OUTPUT POWER AND NARROW BANDWIDTH

[75] Inventors: James L. Pratt, Penfield; Michael J. Hill, Rochester, both of N.Y.

[73] Assignee: Xerox Corporation, Stamford, Conn.

[21] Appl. No.: 550,316

[22] Filed: Oct. 30, 1995

[51] Int. Cl.[6] .............................. H02M 3/335

[52] U.S. Cl. .............................. 363/17; 363/132; 363/98; 315/106

[58] Field of Search .............................. 363/21, 61, 41, 363/46, 45; 315/105, 107, 106, 47; 331/91, 87

[56] References Cited

U.S. PATENT DOCUMENTS

| | | | |
|---|---|---|---|
| 3,651,371 | 3/1972 | Tingley | 315/102 |
| 3,873,883 | 3/1975 | Sievers et al. | 315/105 |
| 4,481,447 | 11/1984 | Stupp et al. | 315/101 |
| 4,628,284 | 12/1986 | Bruning et al. | 331/86 |
| 4,742,442 | 5/1988 | Nillssen | 363/98 |
| 4,777,575 | 10/1988 | Yamato et al. | 363/21 |
| 5,003,141 | 3/1991 | Braunisch et al. | 219/10.55 B |
| 5,082,998 | 1/1992 | Yoshioka | 219/10.55 B |
| 5,222,015 | 6/1993 | Nakagawa | 363/21 |
| 5,224,027 | 6/1993 | Kyong-keun | 363/21 |
| 5,250,774 | 10/1993 | Lee | 219/10.55 B |

*Primary Examiner*—Peter S. Wong
*Assistant Examiner*—Shawn Riley

[57] ABSTRACT

A power supply for a magnetron generating a DC output having a low voltage ripple content at the power supply output for energizing the magnetron. The power supply includes a voltage and current controlled regulator circuit transmitting an output signal having a voltage level and current level established according to the voltage across the magnetron and the current flowing through the magnetron. The ripple content of the power supply output is less than approximately 5–7% and causes the magnetron to operate in a relatively narrow bandwidth of approximately ±5 Megahertz. In one embodiment, an output of an induced sawtooth waveform is generated by turning on and turning off an AC supply to the power supply circuit to induce a ripple voltage for causing the magnetron to enter the correct operating frequency. In another embodiment, a regulator circuit generates a square wave signal having a period of oscillation based on the current flowing through the magnetron. The square wave signal is then converted to a DC voltage and applied to the magnetron to cause the magnetron to enter the correct operating frequency.

24 Claims, 6 Drawing Sheets

POWER SUPPLY FOR A MAGNETRON HAVING CONTROLLED OUTPUT POWER AND NARROW BANDWIDTH

FIELD OF THE INVENTION

The present invention relates generally to a power supply for a magnetron and more particularly relates to a power supply starting up a magnetron and generating microwaves within a relatively narrow bandwidth.

BACKGROUND OF THE INVENTION

Microwave heating is a well known technique whereby microwave frequencies, typically greater than 500 Megahertz, are applied through an applicator, including cavities and waveguides, to heat a variety of materials and/or objects. While microwave energy can be generated by a number of devices, for instance, the klystron, the traveling wave tube, and the magnetron, the use of the magnetron in heating applications is widely known. The magnetron is, however, a device which can only be operated efficiently under certain operating conditions based on known structural characteristics.

The magnetron typically consists of a hollow copper anode having a resonant microwave structure and an electron emitting cathode located at the center thereof. Electrons are emitted from the cathode and attracted to the anode if the anode is positively charged relative to the cathode. When electrons are attracted from the cathode towards the anode, a magnetic field around the cavity and the applied electric field cause electrons to travel in a path about the cathode. The anode, which includes a number of cavities, has one cavity used to direct the developed microwave energy towards an attached applicator, such as the waveguide.

When starting a magnetron, a no load condition occurs. At startup, no current or electrons flow between the cathode and anode until a specific voltage is reached, called the Π-mode (pi mode) voltage. Once reached, anode current rises rapidly reaching its maximum rated value with a further voltage increase of only a small amount. Since the magnetron includes a number of cavities tightly coupled together, a number of other possible field distributions, called modes, including the Π-mode, are possible. Some of those modes may be close to each other in frequency. The Π-mode is, however, the most efficient of all the modes, and, consequently, the magnetron operates most efficiently in this mode. Unwanted modes, on the other hand, resonate at incorrect frequencies, also known as moding, wherein the magnetron efficiency is low. Excessive internal heating can occur and damage the magnetron at the incorrect frequencies.

A power supply drives the magnetron and is an important part of any microwave circuit, since the output frequency of the magnetron depends, in part, upon the power supply itself and the applicator to which the magnetron is connected. For instance, in a microwave oven, for cooking or thawing foods, the power output of the magnetron typically ranges anywhere from zero to 1,500 watts depending on the type of foods being prepared. In addition, because foods can be cooked with a relatively wide frequency range of microwaves, the power supplies for such microwave ovens are not generally directed towards accurate control of the output frequency of the magnetron. In certain industrial processes, however, the power level and frequency range is more tightly controlled due to the nature of the material and/or process being performed. Consequently, various methods and apparatus are known for supplying power to a magnetron to cause the magnetron to mode in the proper frequency and to generate the necessary output power. The following references describe these and other methods and apparatus for supplying power to a magnetron.

In U.S. Pat. No. 3,651,371 to Tingley, a power supply for a magnetron and a microwave oven is described. A high impedance transformer furnishes power to half-wave, oppositely pulled, voltage doubler circuits in which a time delay is provided responsive to the load current of the magnetron, to delay the turning on of one of the half-wave voltage doubler circuits to insure operation in the desired oscillating mode. The filament of the magnetron is fed by a separate filament transformer turned on at the same time as the high impedance transformer but which includes means for lowering the filament voltage incident to switching to the high power mode.

U.S. Pat. No. 3,873,883 to Seivers et al., describes a positive ignition power supply for a magnetron. The power supply includes a step-up transformer having a primary winding for connecting to an AC power source and at least one secondary winding. A full wave voltage multiplying rectifier circuit connected to the secondary winding and the anode-cathode circuit of the magnetron applies a time varying voltage across the anode-cathode circuit of the magnetron. The filament circuit of the magnetron and the anode-cathode circuit are simultaneously energized. The time varying voltage applied to the anode-cathode circuit insures that the magnetron goes into a proper mode of oscillation.

U.S. Pat. No. 4,481,447 to Stupp et al., describes a method of controlling the power output of a magnetron and an electric power supply for supplying power to the magnetron. Power is continuously supplied to the magnetron heater while at the same time, a voltage is continuously applied across the anode and cathode of the magnetron. The voltage across the anode and the cathode repeatedly varies in cycles between a first value, which is substantially at or below the threshold voltage of the magnetron tube, and a second value, which is above the threshold voltage.

U.S. Pat. No. 4,742,442 to Nilssen, describes a power supply for a magnetron in a microwave oven. A full bridge inverter power supply includes two pairs of switching transistors and is conditionally operable to self oscillate in one of two modes. In the first mode, one of the two pairs of switching transistors self oscillates in the manner of a half bridge inverter and powers the cathode. In the second mode, both pairs of transistors self oscillate in the manner of a full bridge inverter and provide the anode power as well as heating power.

U.S. Pat. No. 5,003,141 to Braunisch et al., describes a magnetron power supply with indirect sensing of magnetron current. A switch mode power supply, which drives the magnetron, includes a resonance circuit having a transformer connected to the magnetron by a multiplier consisting of a rectifier and voltage doubler circuit. A current transformer is connected in series with one of the diodes in the rectifier and voltage doubler circuit to obtain a feedback signal which is proportional to the power fed to the magnetron. The sensed feedback signal is compared in a control circuit with a reference signal, the comparison of which is used to control the switch frequency and thereby the magnetron power.

U.S. Pat. No. 5,082,998 to Yoshioka, describes a switching power supply in which DC power is changed to a pulse by means of a switching element coupled to a primary winding of an inverter transformer to supply power from a secondary winding of the transformer to a magnetron coupled thereto. The inverter transformer has a supplementary winding which is coupled to the control side of the switching element to form a self-excited voltage resonance type.

U.S. Pat. No. 5,224,027 to Kyong-keun, describes a power supply for a magnetron wherein as abrupt current changes occur under loaded power supplies, the power supply detects currents and protects the magnetron from overcurrents by controlling output voltages through feeding back the voltages according to currents and by outputting stable power supplies.

U.S. Pat. No. 5,250,774 to Lee, describes a power supply circuit for driving a magnetron equipped in a microwave oven which provides a stable power to the magnetron by preventing instability of output voltage due to LC resonance between a high voltage condenser and by good insulation between the secondary windings of the transformer in a switching mode power supply employing pulse width modulation.

SUMMARY OF THE INVENTION

In accordance with one aspect of the present invention, there is provided a power supply for a magnetron having a filament. The power supply includes a high voltage power supply circuit having a power supply circuit output coupled to the magnetron and a power supply circuit input. The high voltage power supply circuit transmits a DC output having a low voltage ripple content at the power supply circuit output for energizing the magnetron.

Pursuant to another aspect of the present invention, there is provided a method for supplying power to a magnetron having a filament. The method of supplying power includes the steps of applying a sawtooth waveform to the magnetron and repeating the applying step until the magnetron generates a microwave output in a selected mode.

In accordance with a further aspect of the present invention, there is provided a method of starting a magnetron having a filament. The method includes the steps of applying a high voltage DC signal generated from an AC signal to the magnetron, pulsing the AC signal to generate a high ripple content voltage signal at the magnetron, and repeating the pulsing step until the magnetron generates a microwave output in a selected mode.

While the present invention will be described in connection with a preferred embodiment thereof, it is not intended to limit the invention to that embodiment. On the contrary, it is intended to cover all alternatives, modifications, and equivalents as may be included within the spirit and broad scope of the invention as defined by the appended claims.

DETAILED DESCRIPTION OF THE INVENTION

Figure 1:
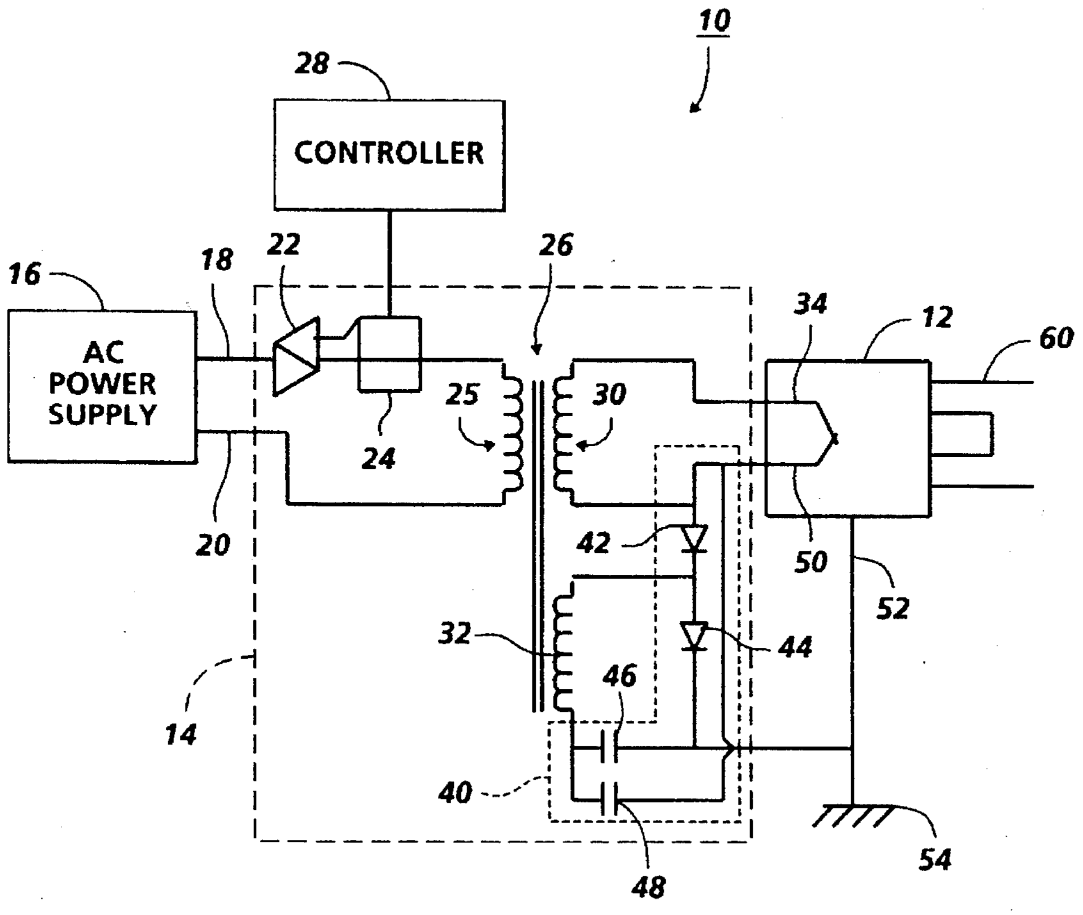
FIG. 1 is a circuit diagram illustrating one embodiment of a microwave generating circuit including a magnetron and a power supply.

FIG. 1 illustrates a circuit diagram depicting a microwave generating circuit 10 including a magnetron 12 and a power supply circuit 14. The power supply circuit 14 is coupled to an alternating current power supply 16, such as a standard 120 volt AC residential or commercial power supply. The AC input generated by the alternating current power supply 16 is coupled to the power supply circuit 14 through a first lead 18 and a second lead 20. The first lead 18 is coupled through an optical coupler 22 connected to a Triad™ 24, or gate-controlled semiconductor AC switch, to a first side of a primary 25 of a leakage inductance transformer 26. The second lead 20 is connected to a second side of the primary 25 of the leakage inductance transformer 26. The optical coupler 22 provides a 3 KVA isolation barrier between the AC line and the leakage inductance transformer 26. The triac 24 is a known type of semiconductor switching device which is triggered to conduct current in response to a signal at the gate electrode thereof. When the level of current through the triac falls to zero, the device automatically switches off and another voltage pulse must be applied to the gate of the triac in order to place the triac in a current conducting or ON condition. In the present invention, the triac is controlled by a controller 28 which can either be a programmed microprocessor or other known devices such as an ASIC. In operation, the triac is used to pulse the alternating current line voltage received from the AC input 16 on and off. The Zero cross opto coupler 22, due to its ability to sense for a zero cross, determines the least amount of surge and therefore output power of the triac is directly related to the AC line.

The primary of the leakage inductance transformer 26 is coupled to the output of the triac 24 and, consequently, a first secondary winding 30 and a second secondary winding 32 have induced voltages resulting from the application of the pulsed AC line to the primary of the transformer 26. The first secondary winding is coupled to a filament 34 of the magnetron and receives approximately 3 to 3½ volts AC RMS whenever the triac 24 is switched on to thereby pass AC current through the transformer. While the filament voltage is generated by winding the transformer core with a few wraps of wire, the filament could also be driven separately with another transformer. The second secondary winding 32 is coupled to a full wave voltage doubler circuit 40 including a first diode 42, a second diode 44, a first capacitor 46, and a second capacitor 48. The full wave voltage doubler is coupled between a cathode 50 and an anode 52, which is grounded to earth ground 54, of the magnetron 12. The present invention uses a 95% efficient leakage inductance transformer to allow for a high power factor correction and is produced by MagneTek, of Huntington, Ind. The capacitors 46 and 48 have a very low equivalent series resistance (ESR) rating and a very low leakage current rating. The capacitors 46 and 48 are from CSI and are 0.48 microfarads, 4 KVAC. The leakage inductance transformer and capacitors 46 and 48 operate cooperatively in a resonance type configuration to produce a high power factor correction.

The microwave generating circuit 10 includes the magnetron 12 which is coupled to an output waveguide 60. While the magnetron used in the present invention is a standard domestic or commercial device used in microwave ovens having an output of 850 watts, the output waveguide is one which requires a microwave frequency having a relatively narrow bandwidth on the order of approximately ±5 Megahertz. Such a waveguide is described in U.S. Pat. No. 5,410,283 to Gooray et al. and U.S. Pat. application Ser. No. 08/159,908, filed Nov. 30, 1993, entitled "Apparatus and Method for Drying Ink Deposited by Ink Jet Printing", both of which are incorporated herein by reference. Due to the frequency limitations of the output waveguide 60, a low ripple high voltage power supply is required, since it has been found that the frequency bandwidth of a magnetron is directly related to ripple content of the associated power supply. While the leakage inductance transformer 30 and the full wave doubler circuit 40 fit the necessary frequency requirements and required output level, such low ripple high voltage power supplies make it difficult to properly operate the magnetron correctly from a "cold start". Consequently, the present invention includes a power on technique consisting of heating of the filament/cathode simultaneously with applying a high voltage having an induced ripple to the cathode/anode so that moding can begin. The power on technique consists of a sequence of timed ramped voltages applied across the cathode and anode while the heater filament receives a 3 to 3½ volt AC RMS wave form.

Figure 2:
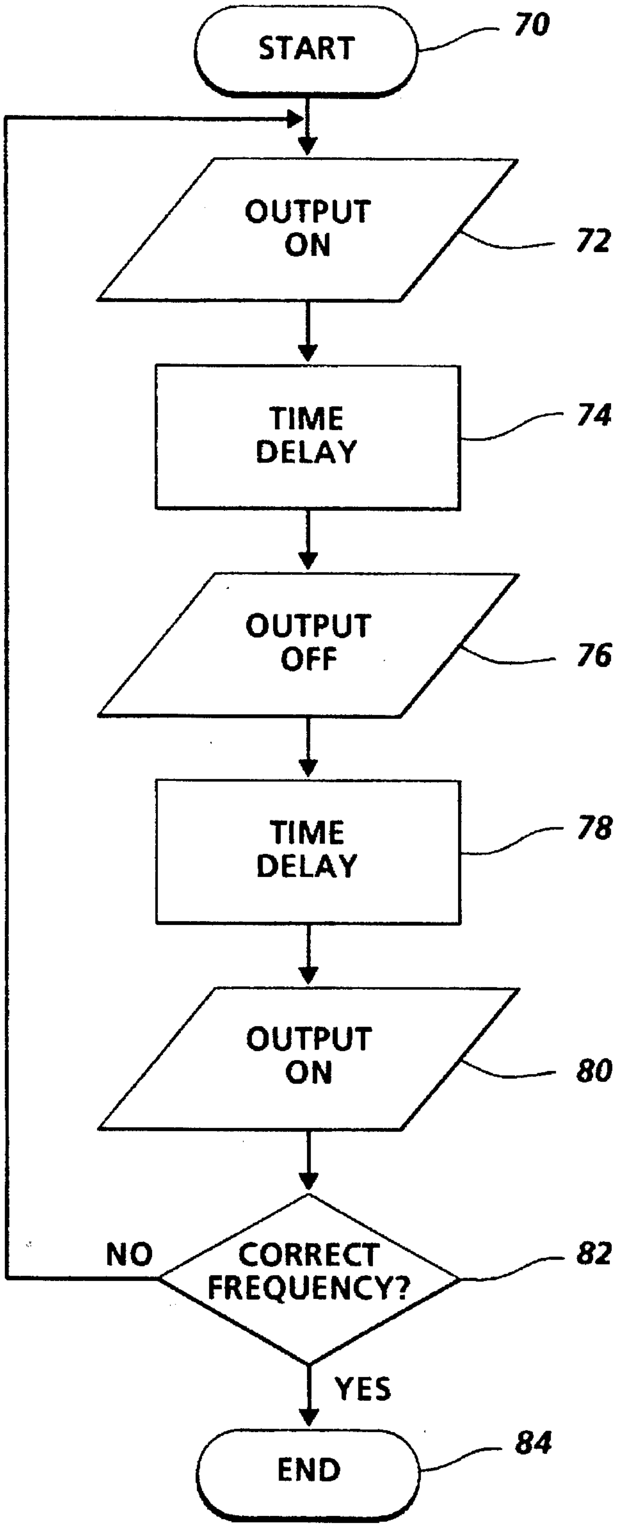
FIG. 2 is a flow diagram illustrating a procedure for powering on a magnetron using the circuit illustrated in FIG. 1.

The power supply circuit 14, as illustrated in FIG. 1, is a power supply having an output voltage across the anode/cathode with an inherent low ripple content on the order of less than 7%. Due to the low ripple content, a start up sequence, as illustrated in FIG. 2, is performed under control of the controller 28 to cause the magnetron 12 to start properly, since low ripple content voltages do not provide for reliable starting of a magnetron. Initially, a high ripple voltage content signal is applied which is generated from pulsing an AC input line voltage. Then, an analysis is made to determine whether the proper mode of operation is present. If not, the application of the high voltage ripple signal is continued to induce and cause the magnetron to reach the correct operating mode. Once the correct mode is achieved, the output voltage is kept low by the proper filtration capacitors, capacitors 46 and 48.

The controller 28 is programmed according to well known practices. It is commonplace to program and execute control functions and logic with software instructions for conventional or general purpose microprocessors. This is taught by various prior patents and commercial products. Such programming or software may, of course, vary depending on the particular functions, software type, and microprocessor or other computer system utilized but will be available to, or readily programmable, without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI designs.

As shown in FIG. 2, the controller 28, at step 70, sends a start signal to the triac 24 such that at step 72 the output of the AC input 16 passes through the primary side of the leakage inductance transformer 26. AC power is applied to the power supply circuit 14 which through the transformer 26 applies power to the filament 34 and to the high voltage cathode 50 of the magnetron 12o In step 74, a time delay, previously determined and stored in the memory of the controller 28 or in an external memory, introduces a system dependent delay. If the magnetron 12 is in a cold environment, the length of the system dependent delay could be up to 10 seconds. System measurements with a known magnetron, however, indicate that a system delay of 3 seconds in a 70° F. environment is sufficient. This time delay enables heating of the filament/cathode simultaneously with applying high voltage to the magnetron 12 to thereby establish a moding condition in the magnetron 12.

The moding condition enables the magnetron to shift frequency from an improper mode to the proper Π mode. During the period of time that the AC power is applied through the power supply circuit 14, the full wave voltage doubler 40 consisting of the capacitors 46 and 48 and the diodes 42 and 44 continue to apply a ramped voltage across the cathode 50 and the anode 52. The capacitors in one embodiment are 0.48 microfarads and have a voltage rating of 4 kilovolts. Once the moding begins, the AC power is removed in step 76 from the power supply circuit 14. Once removed, the voltage at the anode/cathode begins to drop due to the discharge of the capacitors 46 and 48 across the magnetron. The discharge of the capacitors continues for a preestablished time delay, controlled by the controller 28 of approximately 30 to 200 milliseconds, as illustrated in step 78. Once the time delay at step 78 has been completed, the AC power is again applied to power the filament and high voltage cathode at step 80. At this time, it is determined whether or not the magnetron is operating at the correct frequency in step 82. If it is not, the controller returns to step 72 and applies a time delay different than the cold start time delay, since at this time the magnetron is no longer cold and the amount of time delay required is less than that for starting the magnetron from a cold start. Steps 76, 78, 80, and 82 are then repeated as previously described until the magnetron is operating at the correct frequency. Once the correct frequency is obtained, a steady state DC voltage is applied to the magnetron to maintain proper operation.

Figure 5:
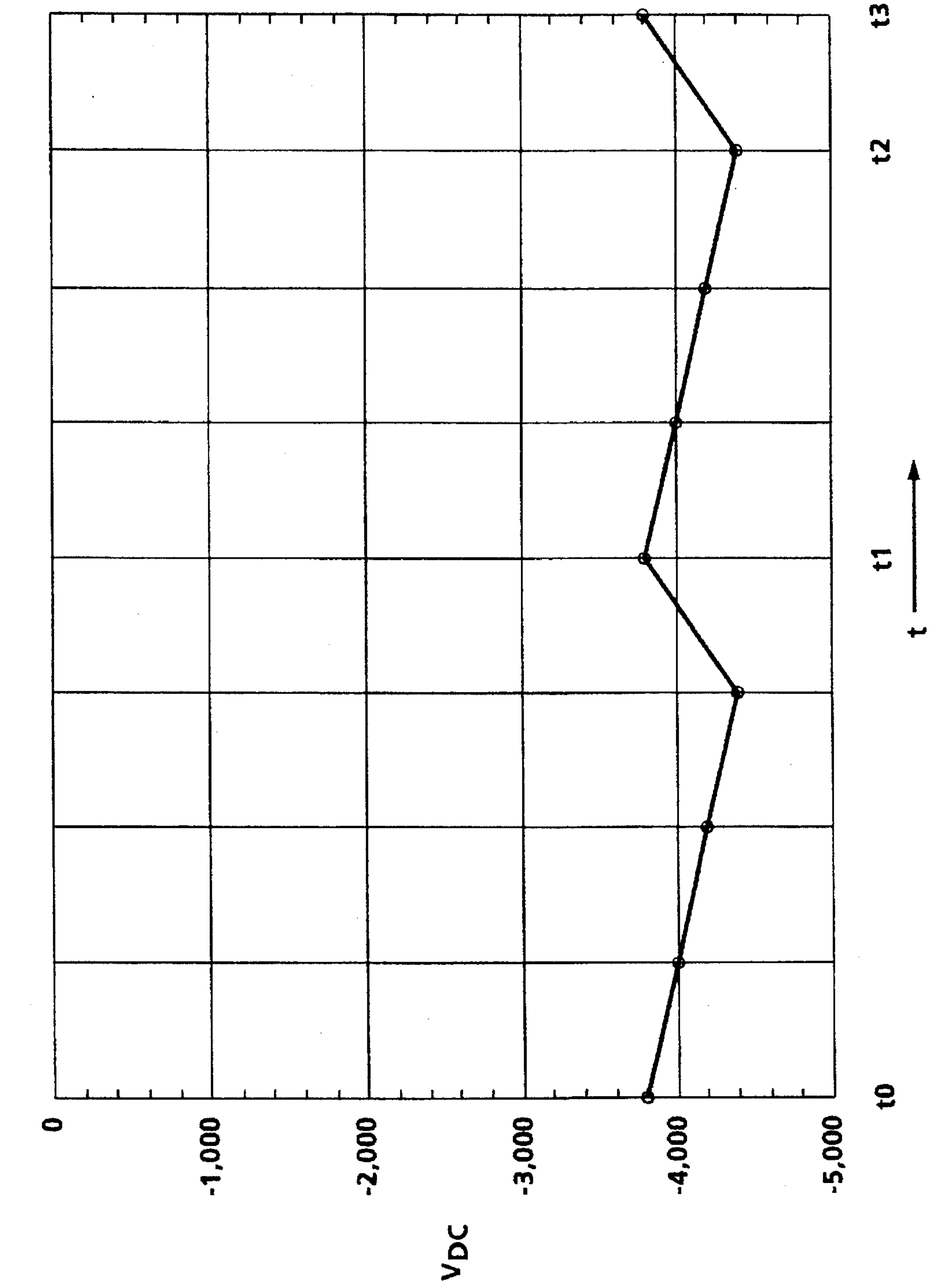
FIG. 5 illustrates a plot of the ramped voltage applied to the cathode of the magnetron versus time for the embodiments of FIG. 1.

The output of the full wave voltage doubler across the anode and cathode is an induced saw-tooth waveform, resulting from turning on and off the AC waveform, having a period of oscillation equal to the time delay of step 74 plus the time delay at step 78. The time delay of step 74 is shown as t1 to t2 in FIG. 5 and the time delay of step 78 is shown as t2 to t3 in FIG. 5. While the embodiment of the present invention, illustrated in FIG. 1 and FIG. 2 provides for the stable operation of the magnetron 12, this embodiment also relies on knowing the characteristics of the magnetron 12 being used in the microwave generating circuit 10. For instance, the magnetron 12 used in the circuit of FIG. 1 must be pre-tested of otherwise have known operating characteristics, such that the time delays of step 74 and 78 can be preestablished to thereby insure turning on the magnetron 12. Oftentimes, however, pretesting of the magnetron 12 is not possible for a variety of reasons including cost. The embodiment of FIGS. 1 and 2, however, is quite effective in providing for the reliable starting and stable operation of a known magnetron.

Figure 6:
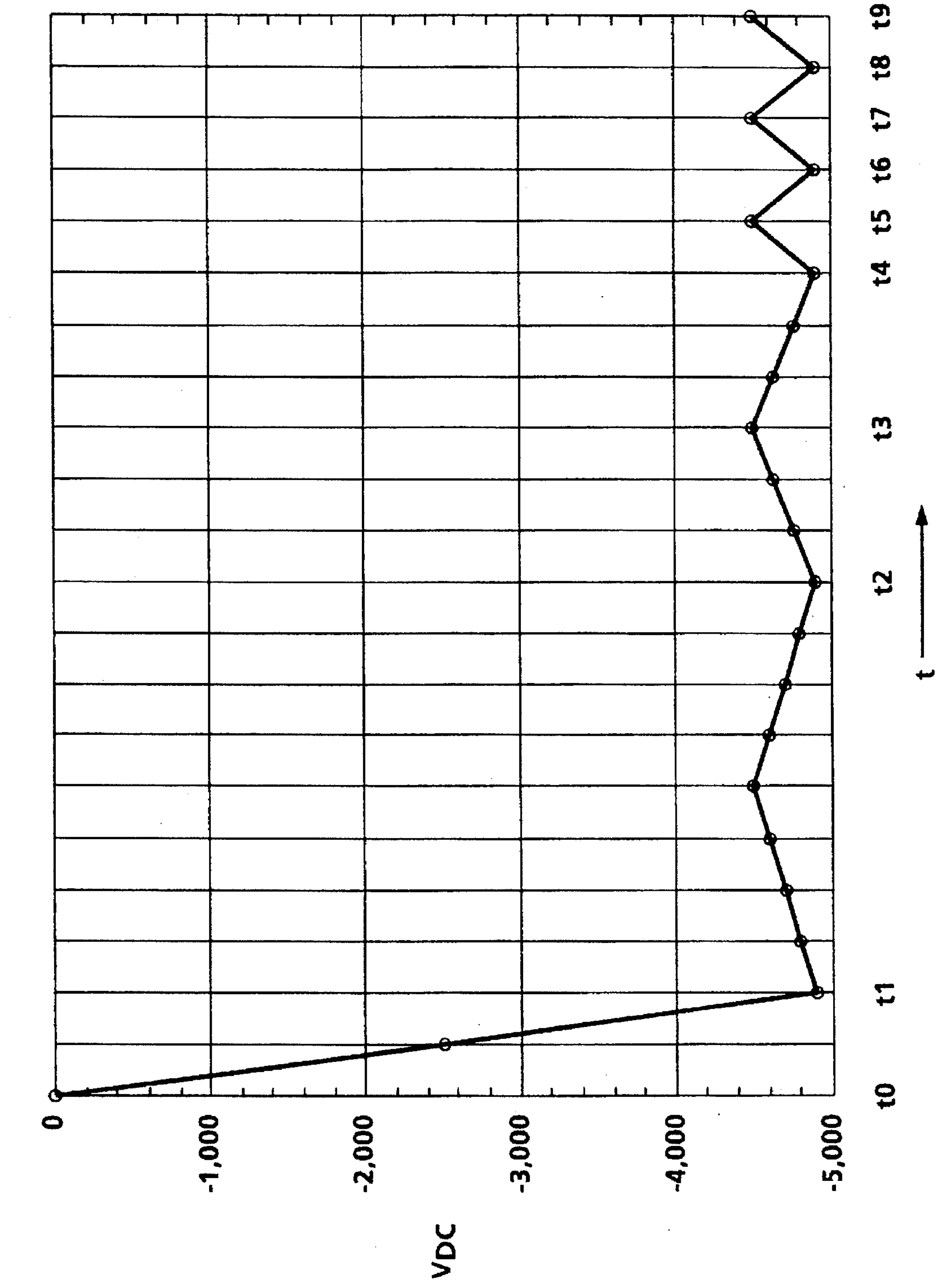
FIG. 6 illustrates a plot of the ramped voltage applied to the cathode of the magnetron versus time for the embodiments of FIGS. 3 and 4

As previously described, the present invention is directed to a reliable starting process for a magnetron wherein moding is reduced and wherein a stable narrow band operating frequency range of a magnetron is achieved. In addition, the power supply circuit provided a current controlled output to thereby control the output power of the magnetron which is related to high voltage current flow through the magnetron. Due to the requirement of a stable narrow band operating frequency range for the magnetron, a second embodiment of the present invention, as illustrated in the block diagram of FIG. 3, includes a power supply circuit 90 which inherently has a low ripple content. Because the magnetron requires a high ripple voltage to shift the magnetron to the correct frequency, the power supply circuit 90 generates a ramping voltage function, as illustrated in FIG. 6, which includes voltages near the ignition voltage of the magnetron which is, for instance, approximately 4,500 volts.

As before, the power supply circuit 90 receives an AC input from an AC input device 92 such as a supply of 120 volts AC. An AC to DC converter 94 converts the AC line input to a DC output of approximately 400 volts DC on the output lines 96 and 98. The AC to DC converter also provides for power factor correction. The DC output lines are connected to the input of a switching regulator section 100 which converts the 400 volts DC to a second DC voltage whose amplitude is controllable based on the sensed operating conditions of a magnetron 102. This second DC voltage appears at the output lines 104 and 106 which are coupled to a high voltage and filament section 108. The high voltage and filament section 108 converts the controllable DC voltage appearing at the output lines 104 and 106 to an AC wave form which is then passed through a transformer and reconverted to a full wave rectified DC output at the output lines 110 and 112 which are respectively coupled to the cathode and anode of the magnetron 102.

An induced ramping or saw-tooth voltage function is generated at the output lines 110 and 112 (see FIG. 6) and is monitored by a voltage sensing circuit to determine when the voltage applied to the magnetron reaches a certain level. The ramping voltage function ramps up or increases in voltage amplitude to induce ignition of the magnetron and then decreases thereby providing an induced ripple voltage. The induced ripple voltage generates a shift in the magnetron operating frequency towards the pi mode.

The ramping voltage is through the ignition point and if the ramping voltage exceeds a predetermined level, the switching regulator section 100 is turned off, according to a signal received from the voltage feed back circuit 114, so that the ramping voltage appearing at output lines 110 and 112 begins to fall. At the same time, a current sense circuit 116 monitors the current flow through the magnetron 102 so that once the magnetron is operating at the correct frequency and correct output power, as shown by current flow, the current sense device 116 signals the switching regulator 100 thereby indicating that the proper current has been reached. Once the current is determined to be in the proper operating range, the power supply circuit 90 shifts to a constant current source and the magnetron continues to operate at the correct frequency range. By changing from the voltage control mode to the current control mode, the power level can be adjusted. A filament circuit 118 is also included in the embodiment of FIG. 3 to heat the filament of the magnetron for operation as previously described in FIG. 1.

At the time current flow is detected, the filament voltage can be removed to reduce the voltage ripple to the lowest value. It has been found that by removing the filament voltage, the magnetron can produce an output having approximately a 2–3 megahertz bandwidth having a fundamental frequency of 2.439 gigahertz. With a heated filament, the bandwidth is in the range of approximately 8–10 megahertz.

Figure 3:
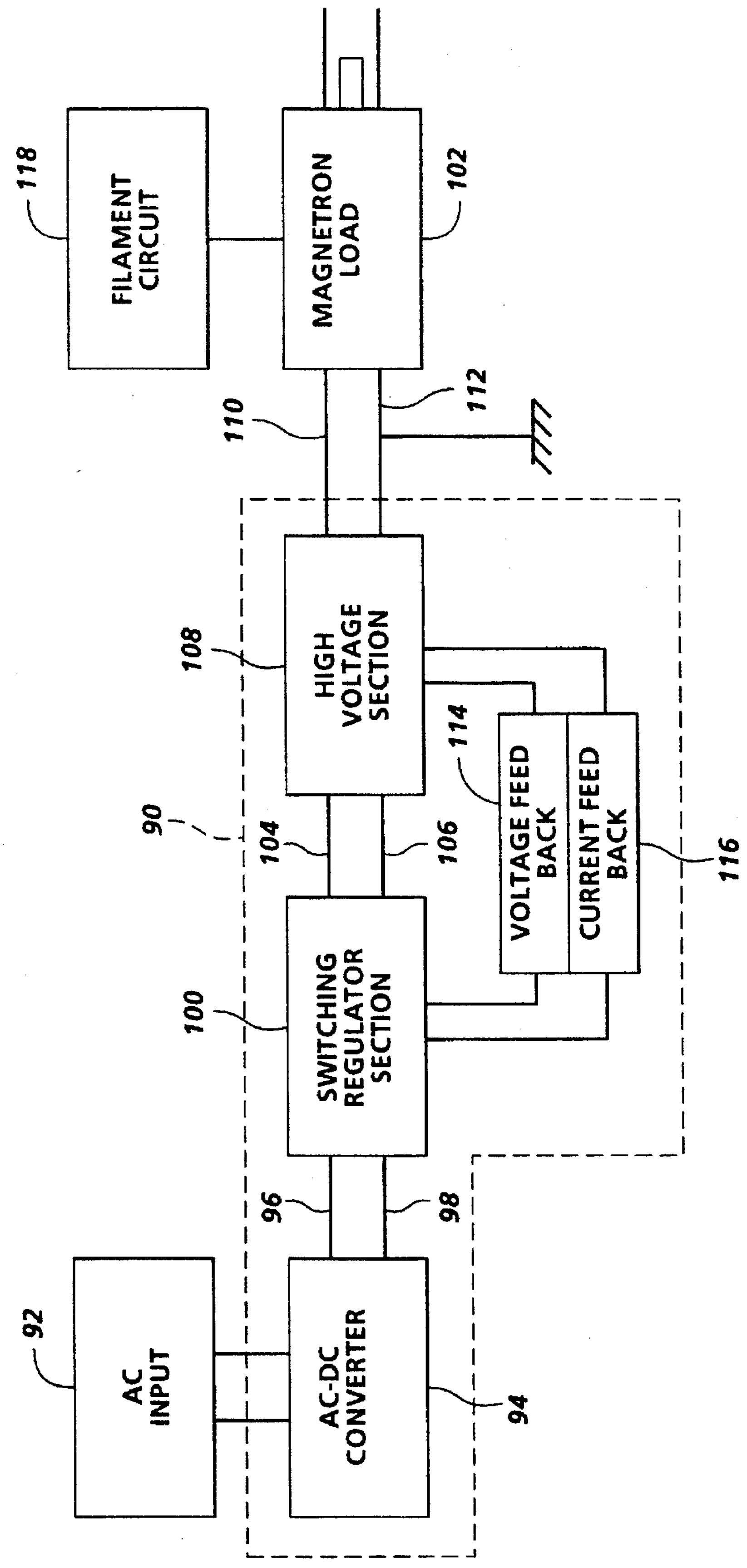
FIG. 3 is a block diagram of a second embodiment of the present invention of a microwave generating circuit including a magnetron and power supply.
Figure 4:
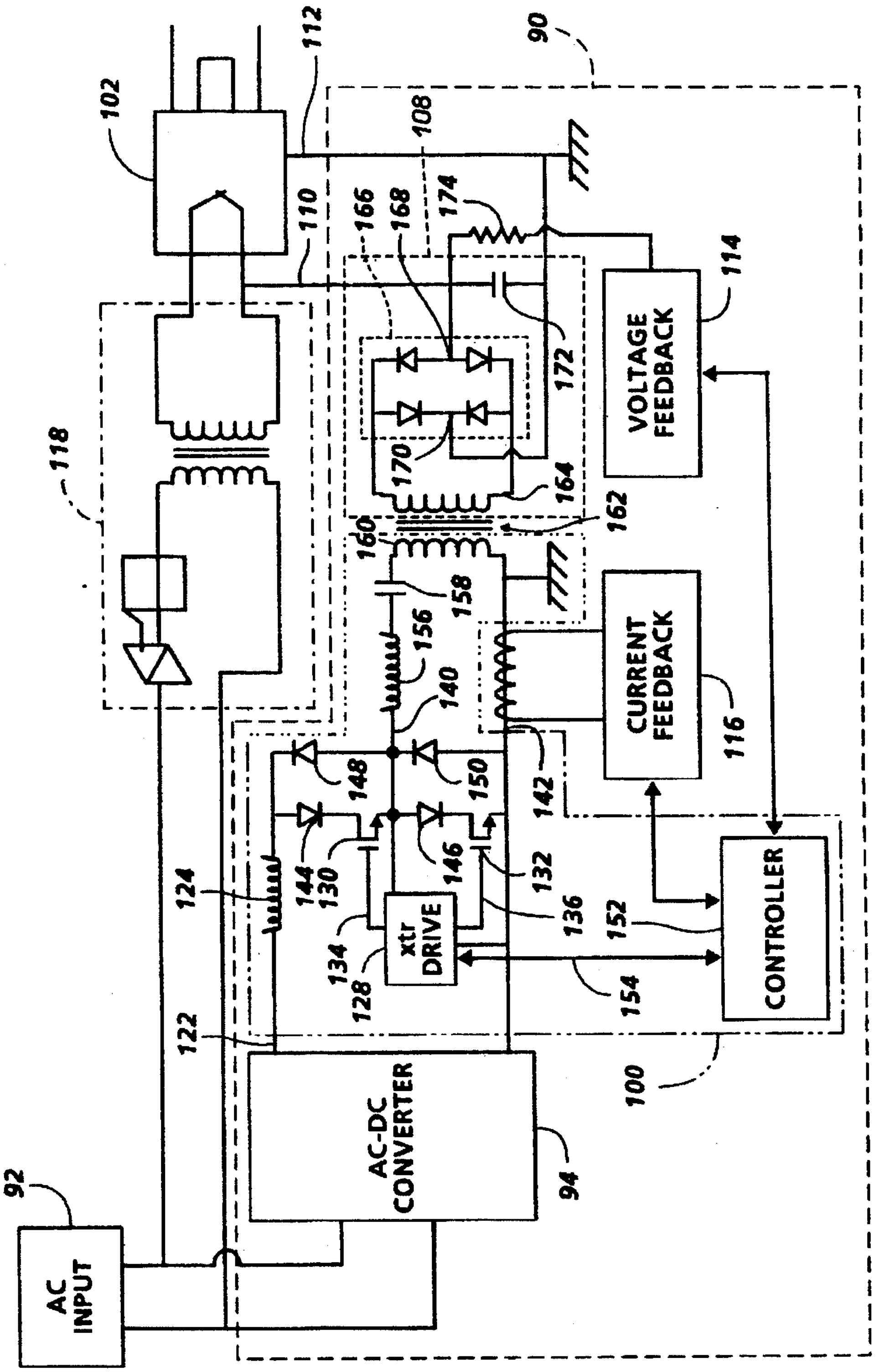
FIG. 4 is a circuit diagram illustrating in more detail the block diagram of FIG. 3.

FIG. 4 illustrates a detailed circuit diagram of the block diagram described in FIG. 3. The power supply circuit 90 receives an AC input from the AC input 92 and initially generates an induced saw-tooth wave form on the output lines 110 and 112. The saw-tooth wave form is generated by converting the AC input to a DC voltage of approximately 400 volts DC by the AC to DC converter 94. The AC-DC converter is a commercially available device which not only makes a power factor correction but also generates a very clean DC voltage having a low ripple content on the order of less than 4% and typically less than 3%. Such a converter is available from Zytec of Eden Prairie, Minn. In addition, the AC-DC converter 94 is used to step up the voltage available from the AC input so that the voltage necessary for the ignition voltage is available to the magnetron 102. An output line 122 is coupled to an inductor 124 which is, in turn, coupled to the switching regulator section 100. The switching regulator section 100 is a high power resonant converter which converts DC to a sinusoidal waveform having a frequency determined according to current flow through the magnetron. The switching regulator section 100 includes a transistor drive circuit 128 which controls the generation of a square wave having a controlled variable frequency. The square wave is generated by a square wave generating circuit including a first field effect transistor 130 and a second field effect transistor 132 each respectively including a gate 134 and a gate 136 coupled to the output of the transistor drive circuit 128. The transistor drive circuit 128 controls the switching of the first FET 130 and the second FET 132 such that the square wave output is generated at a first output line 140 and 142. A first diode 144 connects the conductor 124 to the drain of the FET 130. A second diode 146 connects the source of the FET 130 to the drain of the FET 132. A third diode 148 connects the conductor 124 to the output line 140 and a fourth diode 150 connects the output line 140 to earth ground.

The square wave at the output lines 140 and 142 has a period of oscillation which is controlled by a controller 152 providing signals to the transistor drive 128 over the line 154. The controller 152 receives control signals which indicate both the voltage level and the current level at output lines 110 and 112 applied to the cathode/anode of the magnetron 102.

After the 400 V DC output has been converted to a square wave output available at the output lines 140 and 142, a series resonant circuit consisting of an inductor 156 and a capacitor 158 coupled to a primary 160 of a high voltage step-up transformer 162 to smooth the square-wave signal, by removing unwanted switched harmonics. The LC circuit, consisting of the inductor 156, the capacitor 158 and the primary 160 of the transformer 162, convert the square wave output to a sinusoidal current waveform which is very low in emission and contains only a fundamental frequency. This generated sine wave, having the described characteristics, is necessary so to provide very low output ripple voltage that the magnetron operates from in the required narrow frequency range. The sinusoidal current conducted through the primary 160 is transformed by the transformer 162 to generate a high voltage output sinusoidal current conducted through a secondary 164 of the transformer 162. The sinusoidal current appearing across the secondary 164 is then rectified by a full wave bridge 166. The full wave rectified current appearing at a first output line 168 and a second output line 170 of the full wave bridge 166 is coupled to a capacitor 172. The capacitor 172 is, in turn, connected to the output lines 110 and 112. The function of the capacitor 172 is to smooth out the full wave rectified signal. The capacitor is a 0.1 microfarad capacitor having a voltage rating of 6,000 volts DC.

Due to the characteristics of the magnetron, the voltage appearing across the capacitor 172 and therefore at the cathode/anode of the magnetron 102 increases in amplitude when the power supply is first turned on since current does not immediately flow through the magnetron. A resistor 174, connects the output line 168 to the voltage feedback device 114. The voltage feedback device monitors the voltage across the capacitor 172 to insure that the voltage is limited such that it does not increase above an acceptable level, for example, 4900 volts. At approximately 4900 volts, the voltage feedback device 114 which is coupled to the controller 152, sends a signal thereto indicating that the transistor drive should turn off the first FET 130 and the second FET 132 such that no sinusoidal current is generated through the primary 160 of the transformer 162. At this time, the voltage across the capacitor 172 begins to decrease in amplitude such that the output voltage at the lines 110 and 112 resembles the oscillating saw tooth wave form of FIG. 6. At the same time that the voltage feedback circuit 114 is sensing voltage, an average current feedback circuit 116 senses the sinusoidal current through the primary 160 of the transformer. The current sensed by the average current feedback circuit 116 indicates the current flow through the magnetron 102. Once the current feedback signal indicates that the correct mode of operation for the magnetron is being reached, the voltage output of the circuit changes more rapidly, as illustrated in FIG. 6 for the times t4 through t9. This higher frequency of transition between maximum and minimum values indicates that the magnetron is beginning to operate in the proper mode. Once the magnetron is operating at the correct frequency, the amount of current drawn by the magnetron 102 indicates proper operation and a steady state DC waveform is applied to the magnetron. Consequently, the average current feedback circuit 116 sends a feedback signal to the controller 152 which, in turn, controls the transistor drive circuit 128.

The transistor drive circuit 128 is a standard resonant circuit which changes the frequency of the generated square wave at the output lines 140 and 142 by controlling the magnetron current. In this fashion, the amount of sinusoidal current flowing through the primary 160 of the transformer 162 is accurately controlled such that the magnetron 102 operates in the Π mode. t is also possible, however, to use a microprocessor programmed to control the switching of the transistors 130 and 132 instead of using the standard resonant control circuit.

In recapitulation, a method and apparatus for powering a magnetron is described. It is, therefore, apparent that there has been provided in accordance with the present invention, a highly efficient power supply having low ripple content for causing a magnetron to operate in a narrow frequency band. Since a magnetron typically requires a certain amount of ripple to cause the magnetron to mode in the proper frequency and a low ripple power supply cannot typically supply sufficient ripple to cause the magnetron to operate in the proper frequency, the present invention induces a ripple voltage to cause the magnetron to lock onto the correct frequency. Once the magnetron is operating in the correct mode, the ripple is no longer induced and the magnetron maintains operation in a relatively narrow frequency band width.

While this invention has been described in conjunction with a specific embodiment thereof, it is evident that many alternatives, modifications, and variations will be apparent to those skilled in the art. For instance, the present invention can be used in any application where accurate and reliable induction of a magnetron is required. In addition, the present invention is not limited to the circuit elements described but many alternatives, as known to those skilled in the art, are possible. Accordingly, it is intended to embrace all such alternatives, modifications and variations that fall within the spirit and broad scope of the appended claims.

What is claimed is:

1. A power supply for a magnetron having a filament, comprising:

a high voltage power supply circuit, including a power supply circuit output coupled to the magnetron and a power supply circuit input, transmitting a DC output having a low ripple content at said power supply circuit output for energizing the magnetron, and;

a switching circuit, including a switching circuit input receiving an AC input signal thereon and a switching circuit output coupled to said power supply circuit input, switching the AC input signal on and off to transmit on said switching circuit output an output signal transitioning between no signal and a power factor corrected signal.

2. The power supply of claim 1, wherein said high voltage power supply circuit comprises an induced ramping waveform generating circuit generating an induced ripple voltage having a period of oscillation.

3. The power supply of claim 2, wherein the period of oscillation is approximately 200 milliseconds or less.

4. The power supply of claim 1, wherein said high voltage power supply circuit comprises a low ripple, high voltage power supply circuit transmitting the DC output with a ripple content of less than approximately 7%.

5. The power supply of claim 4, comprising an energizing circuit coupled to the filament of the magnetron, energizing the filament for heating thereof.

6. The power supply of claim 5, wherein said switching circuit comprises an AC switch.

7. The power supply of claim 6, comprising an AC power supply coupled to said switching circuit input, supplying the AC input signal.

8. The power supply of claim 7, wherein said energizing circuit is coupled to said switching circuit output of said switching circuit.

9. The power supply of claim 8, wherein said high voltage power supply circuit comprises a full wave voltage doubler circuit coupled to the magnetron, converting the AC input signal to a DC voltage signal.

10. A power supply for a magnetron having a filament, comprising:

a high voltage power supply circuit, including a power supply circuit output coupled to the magnetron and a power supply circuit input, transmitting a DC output having a low ripple content at said power supply circuit output for energizing the magnetron, said high voltage power supply circuit including a high power resonant converter circuit, having a converter circuit input receiving a DC signal and a converter circuit output transmitting a resonant converter output signal having a voltage level and current level established according to the voltage across the magnetron and the current level flowing through the magnetron.

11. The power supply of claim 10, wherein said high power resonant converter circuit comprises a switching circuit including an input receiving a control signal switching the resonant converter output signal on and off to transmit on said converter circuit output an output signal transitioning between no signal and the output signal.

12. The power supply of claim 11, wherein the resonant converter output signal includes a sinusoidal signal having a frequency determined according to the current flowing through the magnetron.

13. The power supply of claim 11, wherein said high power resonant converter circuit comprises a square-wave generating circuit having an input coupled to said converter circuit input and a square-wave generating circuit output transmitting a square wave signal.

14. The power supply of claim 13, wherein said high power resonant converter circuit comprises a series resonant circuit, having a resonant circuit input coupled to said square wave generating circuit output and a resonant circuit output.

15. The power supply of claim 14, further comprising a transformer, said transformer including a primary winding coupled to said series resonant circuit and a secondary winding.

16. The power supply of claim 11, further comprising a controller, coupled to said resonant converter circuit, said controller generating control signals input to said resonant converter circuit, controlling the voltage level and current level of the resonant converter output signal.

17. The power supply of claim 16, wherein the resonant converter output signal generated by said resonant converter circuit transitions between no signal and a sinusoidal signal.

18. The power supply of claim 16, further comprising a high voltage section, coupled to said resonant converter circuit, generating a high voltage DC output signal from the resonant converter output signal of said resonant converter circuit.

19. A method of starting a magnetron having a filament comprising:

applying a high voltage DC signal generated from an AC signal to the magnetron;

applying an AC waveform to the filament to heat the filament;

pulsing the AC signal to generate a high ripple content voltage signal at the magnetron;

repeating said pulsing step until the magnetron generates a microwave output in a selected mode; and removing the AC waveform from the filament of the magnetron once the magnetron generates a microwave output in the selected mode.

20. The method of claim 19, wherein said second mentioned applying step comprises applying the AC waveform to the filament in a pulsing mode simultaneously with said pulsing step.

21. A method for supplying power to a magnetron having a filament, comprising:

applying an induced ramping waveform to the magnetron;

applying an AC waveform to the filament simultaneously with said first mentioned applying step;

repeating said applying step until the magnetron generates a microwave output in a selected mode; and removing the AC waveform from the filament once the magnetron generates a microwave output in the selected mode.

22. The method of claim 21, wherein the selected mode is a pi mode.

23. The method of claim 22, wherein the generated microwave output comprises a bandwidth on the order of less than 3 megahertz.

24. The method of claim 22, further comprising applying a steady state DC voltage signal to the magnetron after the magnetron generates the microwave output in the selected mode.

* * * * *